March 27, 1962 W. J. PHILLIPS 3,027,094
AUTOMATIC SEQUENTIAL LAWN-SPRAYING INSTALLATION
Filed June 10, 1959 2 Sheets-Sheet 2

INVENTOR.
WILLIS J. PHILLIPS
BY
Barthel & Bugbee
ATTORNEYS

# United States Patent Office 3,027,094
Patented Mar. 27, 1962

3,027,094
AUTOMATIC SEQUENTIAL LAWN-SPRAYING INSTALLATION
Willis J. Phillips, 817 Fernwood, Royal Oak, Mich.
Filed June 10, 1959, Ser. No. 819,467
2 Claims. (Cl. 239—66)

This invention relates to lawn-installed spraying systems and, in particular, to selective spraying installations for sequentially spraying different portions of the lawn.

One object of this invention is to provide an automatic sequential lawn spraying installation which, when once turned on without subsequent attention on the part of the operator, automatically distributes the water from the water main sequentially to different groups of spray nozzles, so as to water different sections of the lawn in succession and thereby enable the entire pressure in the water main to be concentrated at a given time upon a single group containing a relatively small number of nozzles with consequently superior spraying range and distribution than in simultaneously dissipating the water pressure over the entire lawn through all of the spray nozzles at once.

Another object is to provide an automatic sequential lawn spraying installation of the foregoing character wherein means is additionally provided for draining off the water remaining in the supply pipe to each group of nozzles before the water pressure is turned into the supply pipe for the next group of nozzles to be set in operation.

Another object is to provide an automatic sequential lawn spraying installation of the foregoing character wherein means is provided for automatically halting the operation of the system and turning off the water after the final group of spray nozzles has completed spraying its section of the lawn.

Another object is to provide an automatic water-distribution selector valve for an automatic sequential lawn spraying installation of the foregoing character, which valve automatically shifts the selector valve member so as to provide distribution of the water sequentially from one distribution pipe to another until all distribution pipes to the various groups of spray nozzles have been operated and ther operation automatically terminated.

Other objects and advantages of the invention will become apparent during the course of the following description of the accompanying drawings, wherein.

Figure 3:
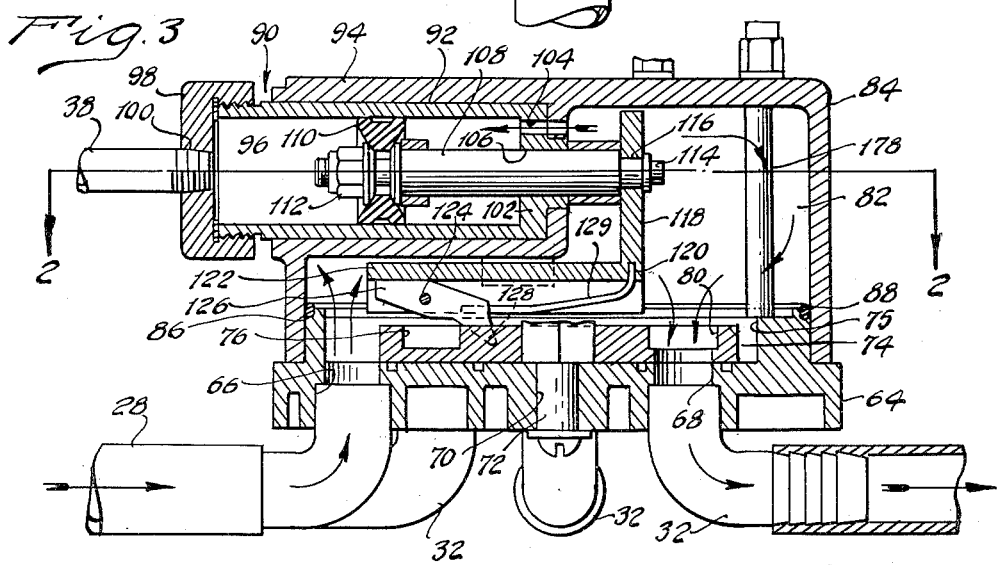
FIGURE 3 is a vertical section through the automatic water distribution selector valve of FIGURE 2, the upper half of which is taken along the line 3a—3a in FIGURE 2 and the lower half along the line 3b—3b therein.

FIGURE 4 is a vertical section of a building basement and adjacent lawn showing a modified automatic sequential lawn-spraying installation, with but a single spray nozzle group shown, and with the selector valve rotated into a vertical position from its usual horizontal position in order to show the connections of the several nozzle groups more clearly; and FIGURE 5 is a vertical sectional view similar to FIGURE 3 but showing the spring-actuated plunger retraction of the modification of FIGURE 4.

General Arrangement

Figure 1:
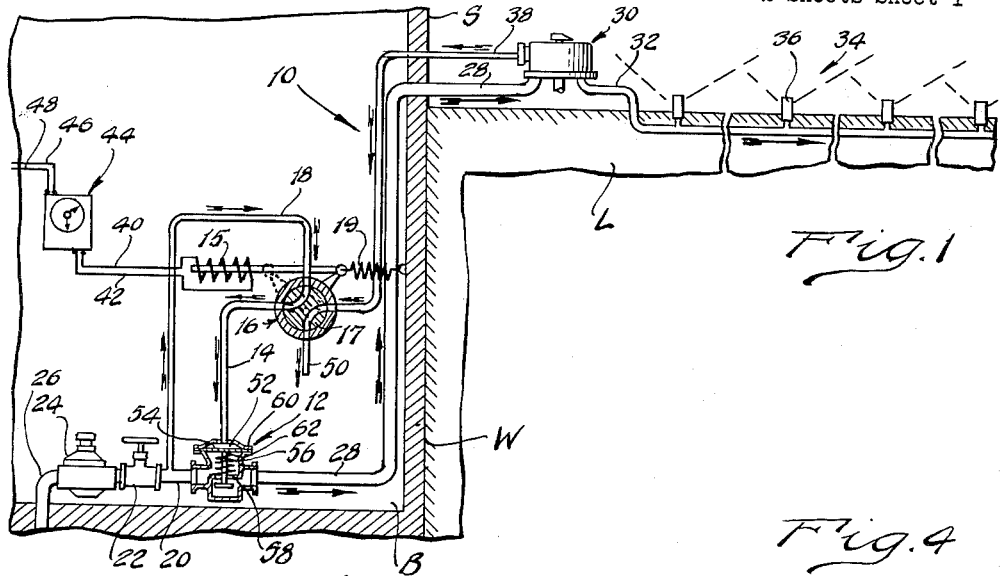
FIGURE 1 is a vertical section through a building basement and adjacent lawn, showing an automatic sequential lawn-spraying installation according to one form of the invention, with but a single spray nozzle group shown, for simplicity of illustration, and with the parts in their spraying positions.

Referring to the drawings in detail, FIGURE 1 shows a sequential lawn spraying installation, generally designated 10, according to one form of the invention as a pressure-operated valve 12 controlled by water under pressure admitted to its operating chamber through a water pressure delivery pipe 14 from a solenoidal valve 16 connected by a water pressure supply pipe 18 to a water main 20. The solenoidal valve 16 has an operating solenoid 15 and valve member 17 movable by it or by a spring 19, as described below. The water main 20 is connected on one side through a manual shut-off valve 22 and water meter 24 to an outside water main 26 running to the city water supply system, and on its other side to the valve chamber of the pressure-operated valve 12. From the pressure-operated control valve 12, a primary water supply pipe 28 leads to a sequential water distribution selector valve 30 from which secondary water distribution pipes 32 lead to groups 34 of spray nozzles 36 embedded in the lawn L.

From the solenoidal valve 16 an auxiliary water pressure delivery pipe 38 leads to the control chamber of the sequential water distribution selector valve 30, as described in more detail below. The solenoidal valve 16 is electrically energized and operated intermittently in response to electric current delivered periodically to it through control lines 40 and 42 from an electrical timing switch 44 which in turn receives electricity from the house lighting current lines 46 and 48. A drain or discharge pipe 50 is connected to the opposite side of the solenoidal valve 16 from the pipe 14. It will be observed from FIGURE 1 that the sequential water distribution selector valve 30 and spray nozzle groups 34 are located outside the wall W of the building structure S, whereas the remainder of the elements of the system or installation just described are located inside the building structure S, as in the basement B thereof.

The timing switch 44, the solenoidal valve 16, the pressure-operated valve 12, the manual shutoff valve 22 and the water meter 24 are conventional and their details are beyond the scope of the present invention. The solenoidal valve 16 is a three-way valve which in its normal or unenergized position maintains an open connection between the water pressure supply pipe 18 and the water pressure delivery pipe 14 and also between the auxiliary water pressure delivery pipe 38 and the drain pipe 50. This action normally maintains a standing hydraulic pressure in the operating chamber 52 of the unenergized pressure-operated valve 12 above its operating diaphragm 54, so as to force its valve plunger 56 downward away from the valve seat 58 in the valve casing 60, compressing the compression spring 62 around the valve plunger 56. On the other hand, when the solenoidal valve 16 is energized, it closes the connection of the pipe 18 to the pipe 14 and also that of the pipe 38 to the drain pipe 50 and opens a connection from the pipe 18 to the pipe 38 and also from the pipe 14 to the drain pipe 50, releasing the standing hydraulic pressure in the valve chamber 52 of the pressure-operated valve 12 so as to permit compression spring 62 to push the valve plunger 56 and diaphragm 54 upward to engage the valve plunger 56 with the valve seat 58 to close communication between the water supply pipes 20 and 28.

Automatic Water-Distribution Selector Valve

Figure 2:
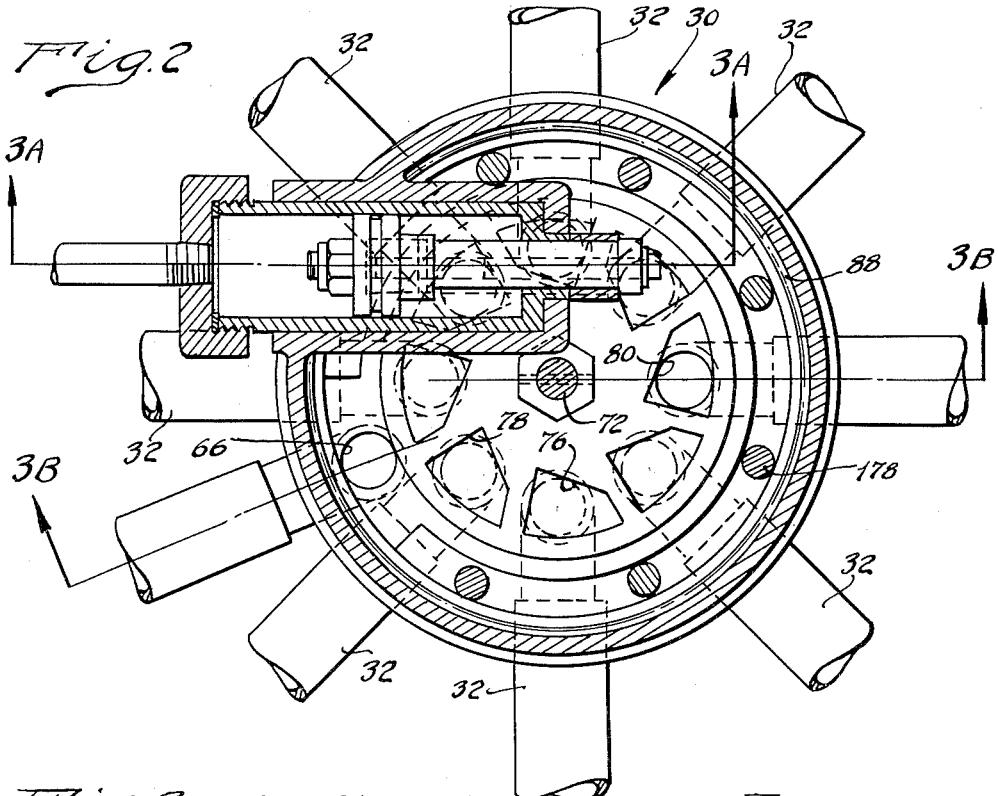
FIGURE 2 is a horizontal section, upon an enlarged scale, through an automatic water distribution selector valve with hydraulically-actuated plunger retraction, used in the installation of FIGURE 1, taken along the line 2—2 in FIGURE 3.

The automatic water distribution selector valve 30 shown in detail in FIGURES 2 and 3 is mounted on a circular base 64. Located near the periphery of the base 64 is a water inlet port 66 to which the pipe 28 is connected, and circumferentially-spaced multiple outlet ports 68 located at equal radii from the bore 70 of a pivot shaft 72 upon which a rotary valve disc 74 is rotatably mounted within a cylindrical recess 75. The secondary water distribution pipes 32 are connected to the outlet ports 68 and lead to the various groups 34 of spray nozzles 36.

The rotary valve disc 74 is provided on its upper side with spaced ratchet recesses 76 of approximately trapezium-shaped outline with partition walls 77 containing ratchet abutment end surfaces 78 engaged by the indexing mechanism described below. The bottom of one of these recesses 76 has a valve port 80 which connects the water inlet chamber 82 within the cup-shaped cap 84 to one of the outlet ports 68 which is aligned therewith at a given time. The cap 84 is inverted over the base 64 (FIGURE 3) and engages an annular rabbett 86, leakage being prevented by an O-ring or other gasket 88 at their junction.

The valve disc 74 is rotated step-by-step to bring the valve port 80 successively into communication with the base outlet port 68 by means of a hydraulic operator, generally designated 90, and including a hydraulic cylinder 92 mounted within a tangentially-disposed tubular boss 94 in the upper part of the cap 84, and threaded at one end 96 to receive an end cap 98 with a threaded port 100 to which the auxiliary water pressure delivery pipe 38 is connected (FIGURES 2 and 3). The opposite end wall 102 of the hydraulic cylinder 92 is provided with a marginal port 104 and a central bore 106 for the passage of a piston rod 108 carrying a piston 110 on its inner end. The piston 110 is preferably of resilient material, such as an elastomer having properties similar to those of rubber, and is held in position by a nut 112 threaded onto the inner end of the piston rod 108. The outer end of the piston rod 108 is of reduced diameter and is secured by a screw 114 in a hole 116 in the upright portion 118 of an angle member or slide 120, the base portion 122 of which is of channel cross-section and carries a pivot pin 124 upon which a pawl 126 is pivotally mounted. The pointed forward end 128 of the pawl 126 is urged downward into each recess 76 against each abutment wall 78 as each recess 76 passes therebeneath by a leaf spring 129 connected at one end to the pawl end 128 and at its other end to the base portion 122.

*Operation*

In the operation of the automatic sequential lawn spraying installation 10 of FIGURES 1, 2 and 3, let it be assumed that the connections have been made as shown in FIGURE 1 and that the various secondary water distribution pipes 32 radiate outward from the selector valve 30 to spray nozzle groups 34 located in various parts of the lawn L, each pipe 32 of each group 34 containing a number of lawn-installed spray nozzles 36. Let it also be assumed that the time switch 44 has been adjusted to energize the solenoid of the solenoidal valve 16 successively at appropriate time intervals according to the nature of the lawn and its coil, in order to give adequate spraying by each spray nozzle group 34.

Let it further be assumed that the valve disc 74 is either at the desired location for supplying water to the desired spray nozzle group, or that the pointer handle 174 has been turned by the operator until the valve port 80 of the valve disc 74 is over the desired outlet port 68 of the pipe 32 leading to the spray nozzle group 34 with which it is desired to start the spraying operation.

The operator now opens the manual shutoff valve 22 so as to admit water from the water main 26 through the water meter 24 to the water supply pipe 20. Water under pressure then flows through the water pressure supply pipe 18 and solenoidal valve 16 through the pipe 14 and thence into the operating chamber 52 of the pressure-operated valve 12, forcing the diaphragm 54 and valve plunger 56 thereof downward, compressing the spring 62 and moving the valve plunger 56 downward away from its valve seat 58. At the same time, the pipe 38 leading from the left-hand or rearward end of the hydraulic cylinder 92 (FIGURE 3) is connected through the solenoidal valve 16 to the drain pipe 50, releasing any water from the rearward end of the hydraulic cylinder 92.

At the same time (FIGURE 1), water also flows through the now open pressure-operated valve 12 and the pipe 28 to the selector valve 30 where it passes through the inlet port 66 into the chamber 82 (FIGURE 3) and thence through the port 104 into the forward end of the hydraulic cylinder 92, shifting the piston 110, piston rod 108, angle member 120 and pawl 126 rearwardly to the left, causing the tip 128 of the pawl 126 to slip over the partition wall 77 between adjacent recesses 76 and drop down into the next rearward recess 76 adjacent the next rearward ratchet abutment surface 78, ready to advance the valve disc 74 and its valve port 80 into registry with the next outlet port 68 when water under pressure is next admitted to the pipe 38. At the same time, water flows out of the valve chamber 82 through the valve port 80 and the outlet port 68 with which it is at the moment aligned into the pipe 32 and thence through the spray nozzles 36 of the selected spray nozzle group 34, spraying the portion of the lawn covered thereby.

When, now, the time switch 44 has come to the end of its inactive period and momentarily closes, energizing the operating solenoid 15 of the solenoidal valve 16, the valve member 17 is shifted thereby so that its operating arm moves into the dotted line position shown in FIGURE 1. When this occurs, the water under pressure standing in the operating chamber 52 of the pressure-operated valve 12 is drained off through the pipe 14, valve member 17 and drain pipe 50 to which the pipe 14 is now connected, permitting the compression spring 62 to move the valve plunger 56 upward against the valve seat 58, closing the pressure-operated valve 12 and momentarily halting the flow of water through the pipe 28 and the selector valve 30 to the spray nozzles 36.

At the same time, the same shifting of the valve member 17 of the solenoidal valve 16 connects the water pressure supply pipe 18 to the auxiliary water pressure delivery pipe 38 so as to deliver water under pressure to the rearward or left-hand end of the hydraulic cylinder 92 (FIGURE 3), causing the piston 110, piston rod 108, angle member 120 and pawl 126 to move to the right, causing the pawl tip 128 in pushing against the adjacent abutment wall 78 to rotate the valve disc 74 by one step in a clockwise direction, so as to align its valve port 80 with the next outlet port 68.

The de-energization of the time clock 44 and operating solenoid 15 of the valve 16 permits the spring 19 (FIGURE 1) to shift the valve member 17 into the position shown in FIGURE 1, whereupon the pressure-operated valve 12 is again opened so as to cause water to flow through the pipe 28 and selector valve 30 into the next water delivery pipe 32 and spray nozzles 36 of the next spray nozzle group 34, thereby causing the next area of the lawn to be sprayed. At the same time, the flow of water through the water pressure supply pipe 18, solenoidal valve 16 and auxiliary water pressure supply pipe 38 again retracts the piston 110 in the manner described above, readying it for subsequent indexing operations upon the next energization of the time clock 44 and solenoidal valve 16.

The modified sequential lawn spraying installation, generally designated 130, shown in FIGURES 4 and 5 includes as before, a water supply main 132, water meter 134, water supply pipe 136 and manual shutoff valve 138 controlling the supply of water to a water supply pipe 140 containing a T 142 to which is connected a drain pipe 144 containing a manual drain valve 146. A solenoidal valve 148 regulates the flow of water between the water supply pipe 140 and the water delivery pipe 150 leading to the modified automatic water-distribution selector valve, generally designated 152, and having secondary water distributing pipes 154 each of which leads to a number of spray nozzles 156 constituting a particular spray nozzle group, generally designated 158. A time switch 160 similar to the time switch 44 regulates the intermittent supplying of electric current from the current supply mains or house lighting circuit 162 and 164 to the current supply lines 166 and 168 leading to the solenoidal valve 148. It will be observed that the pressure-operated valve 12 of the installation of FIGURES 1, 2 and 3 has been omitted from the modified installation 130.

Each time the time switch 160 closes, and correspondingly energizes the solenoidal valve 148, the latter opens so as to supply water to the water delivery pipe 150 and thence to the spray nozzle 158 selected at that particular time by the selector valve 152.

The modified automatic water distribution selector valve 152 is of generally similar construction to the selector valve 30 shown in FIGURES 2 and 3 and consequently similar parts are designated with the same reference numerals. In the modified selector valve 152, however, the pivot shaft 72 upon which the valve disc 74 is mounted has an extension rod 170 pinned thereto and passing upward through a hole 172 in the cap 84, where it has a pointer handle 174 secured to it, as by the screw 176. The pointer handle 174 enables the valve disc 74 to be rotated by hand to start the water spraying with any selected spray nozzle group 158. The cap 84 is secured to the base 64 by fastener studs 178 (FIGURE 5) which have been omitted from FIGURE 3 in order to simplify the showing.

In the modified selector valve 152, the piston 110 and piston rod 108, instead of being advanced hydraulically as in the selector valve 30, is advanced mechanically by a helical compression spring 180 mounted between the piston 110 and the end cap 98, the latter having a vent port 182 to permit air to pass into and out of the left-hand end of the hydraulic cylinder 92.

In the operation of the modified automatic sequential lawn spraying installation 130, let it be assumed that the shutoff valve 138 has been opened and the drain valve 146 closed, and that the time switch 160 has been started in operation to intermittently energize the solenoidal valve 148. Each time the latter is energized, it opens and permits water under pressure to flow from the supply pipes 136 and 140 to the delivery pipe 150 and thence into the water inlet chamber 82 within the cap 84, as before. Here the water pressure forces the piston 110 to the left, retracting the slide 120 and pawl 126 as before, causing its end 128 to pass over the partition wall 77 immediately behind it and drop into the next succeeding recess 76 adjacent its abutment end 78 ready for the next advance or indexing motion of the valve disc 74.

So long as the time switch 160 maintains the energization of the solenoidal valve 148, the water continues to flow through the delivery pipe 150, selector valve 152 and secondary delivery pipe 154 to the selected spray nozzle group 158, spraying water from the spray nozzles 156 thereof onto the portion of the lawn L in which they are located. When the time switch 160 completes its cycle and de-energizes the solenoidal valve 148, the latter closes, shutting off water flow from the water delivery pipe 150, selector valve 152 and secondary water delivery pipe 154, with the result that the water pressure within the chamber 82 under the cap 84 (FIGURE 5) drops substantially to zero as the remaining water escapes through the spray nozzles 156. The drop in pressure in the water inlet chamber 82 causes a consequent drop in pressure within the hydraulic cylinder 92 by way of the end port 104, permitting the compression spring 180 to move the piston 110 to the right and with it the piston rod 108, slide 120 and pawl 126, causing the pointed tip 128 thereof to travel to the right and advance the valve disc 74 another step so as to bring the valve port 80 thereof into registry with another outlet port 68 in the base 64 and thus to select another secondary delivery pipe 154 of another spray nozzle group 158 for the next spraying operation.

When the time switch 160 again closes and again energizes the solenoidal valve 148, the foregoing operation is repeated, the pressure in the water inlet chamber 82 forcing the piston 110, slide 120 and pawl 126 again to the left, again compressing the compression spring 180 and moving the pawl tip 128 over the next preceding partition wall 77 into the next succeeding recess 76 against the next succeeding abutment end 78, ready to advance the valve disc 74 another step when the time switch 44 again de-energizes the solenoidal valve 148.

What I claim is:

1. An automatic sequential water-distributing selector valve comprising a valve casing structure, a hydraulic cylinder communicating therewith, a piston slidable in said cylinder, said valve casing structure having a water inlet port and a plurality of circumferentially-spaced water outlet ports, a rotary valve member rotatably mounted in said casing structure independently of and relatively to said piston upon an axis of rotation perpendicular to the axis of reciprocation of said piston, said rotary valve member having therein a valve port which upon rotation of said rotary valve member successively connects said inlet port to each of said outlet ports, and sliding-to-rotary motion-converting mechanism operatively connecting said piston to said rotary valve member, said motion-converting mechanism being responsive to each admission of water under pressure into said casing structure and consequently responsive to each working stroke of said piston for rotating said valve member step-by-step from outlet port to outlet port while successively registering said rotary valve member port with said outlet ports.

2. An automatic sequential water-distributing selector valve, according to claim 1, wherein said motion-converting mechanism includes a pawl operatively connected to said piston for travel therewith and ratchet wheel means rotatingly connected to said rotary valve member and responsive to engagement by and travel of said pawl for rotating said rotary valve member.

References Cited in the file of this patent
UNITED STATES PATENTS

| | | |
|---|---|---|
| 1,598,238 | Brooks | Aug. 31, 1926 |
| 1,606,245 | Long | Nov. 9, 1926 |
| 1,992,877 | Monthan | Feb. 26, 1935 |
| 2,498,189 | Wattson | Feb. 21, 1950 |
| 2,666,450 | Berry | Jan. 19, 1954 |
| 2,880,757 | Campbell | Apr. 7, 1959 |